(12) United States Patent
Suzuki

(10) Patent No.: US 8,033,943 B2
(45) Date of Patent: Oct. 11, 2011

(54) IN-WHEEL MOTOR DRIVING UNIT

(75) Inventor: Minoru Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/827,132

(22) Filed: Jun. 30, 2010

(65) Prior Publication Data

US 2010/0267509 A1  Oct. 21, 2010

Related U.S. Application Data

(62) Division of application No. 11/990,492, filed as application No. PCT/JP2006/316229 on Aug. 18, 2006.

(30) Foreign Application Priority Data

Aug. 18, 2005 (JP) ................................. 2005-237641

(51) Int. Cl.
*F16H 1/32* (2006.01)
(52) U.S. Cl. ........................................................ 475/179
(58) Field of Classification Search .................. 475/178, 475/179
See application file for complete search history.

(56) References Cited

U.S. PATENT DOCUMENTS

| 1,694,031 | A | * | 12/1928 | Braren | 475/168 |
| 4,552,037 | A | | 11/1985 | Distin, Jr. et al. | |
| 5,123,884 | A | * | 6/1992 | Kondoh et al. | 475/179 |
| 6,440,030 | B1 | * | 8/2002 | Minegishi et al. | 475/178 |
| 6,497,515 | B1 | | 12/2002 | Sahashi et al. | |
| 2004/0248688 | A1 | | 12/2004 | Shimada | |

FOREIGN PATENT DOCUMENTS

| CN | 1062407 | 7/1992 |
| DE | 88 10 135 | 1/1989 |
| EP | 0 087 743 A2 | 9/1983 |
| EP | 0 474 897 A1 | 3/1992 |
| EP | 0 931 714 | 7/1999 |
| EP | 1 502 798 | 2/2005 |
| GB | 929 339 | 6/1963 |
| GB | 955097 | 4/1964 |
| GB | 1 382 425 | 1/1975 |

(Continued)

OTHER PUBLICATIONS

International Search Report issued Oct. 31, 2006 in International (PCT) Application No. PCT/JP2006/316229.

(Continued)

*Primary Examiner* — Edwin A Young
(74) *Attorney, Agent, or Firm* — Wenderoth, Lind & Ponack, L.L.P.

(57) ABSTRACT

A rotary shaft is provided so as to be coaxial with an inner member which comprises a hub ring and a bearing inner ring. External gears are rotatably provided around eccentric portions formed on the rotary shaft. The external gears mesh with internal teeth formed on the inner periphery of a casing. When the rotary shaft rotates, the external gears mesh with the internal teeth one after another, so that their centers rotate about the axis of the rotary shaft. When the rotary shaft rotates once, the external gears rotate about their own axes by an amount corresponding to the difference in number between the external teeth and the internal teeth. The rotation of the external gears about their axes is transmitted through a torque transmission to the inner member, thereby rotating the inner member at a reduced speed.

5 Claims, 5 Drawing Sheets

FOREIGN PATENT DOCUMENTS

| | | |
|---|---|---|
| GB | 1 517 112 | 7/1978 |
| GB | 1 571 918 | 7/1980 |
| GB | 2 117 081 A | 10/1983 |
| GB | 2 357 329 | 6/2001 |
| JP | 58-203250 | 11/1983 |
| JP | 61-252934 | 11/1986 |
| JP | 5-332401 | 12/1993 |
| JP | 10-306854 | 11/1998 |
| JP | 2001-18605 | 1/2001 |
| JP | 2004-301235 | 10/2004 |
| JP | 2005-007914 | 1/2005 |
| JP | 2005-178663 | 7/2005 |
| JP | 2005-201310 | 7/2005 |
| JP | 2005-212656 | 8/2005 |

OTHER PUBLICATIONS

Chinese Office Action issued Nov. 13, 2009 in corresponding Chinese Application 200680027996.9 (with partial English translation).

European Search Report issued Jul. 6, 2010 in counterpart European Application No. 06 79 6540.

European Search Report issued Aug. 25, 2010 in counterpart European Application No. 10 00 7033.

European Office Action issued Apr. 4, 2011 in counterpart European Application No. 06 796 540.0.

European Office Action issued May 9, 2011 in a counterpart European Application No. 10 007 033.3.

\* cited by examiner

IN-WHEEL MOTOR DRIVING UNIT

This application is a Divisional of U.S. application Ser. No. 11/990,492, filed Mar. 12, 2008, which is a national stage application of International application No. PCT/JP2006/316229, filed Aug. 18, 2006.

TECHNICAL FIELD

The present invention relates to a power transmission device for reducing and transmitting the rotation of a rotary shaft to a wheel of a vehicle.

BACKGROUND ART

Conventional power transmission devices for transmitting power to vehicle wheels are disclosed in JP Patent Publication 2005-7914A and JP Patent Publication 5-332401A. The one disclosed in JP Patent Publication 2005-7914A, which is an in-wheel motor driving unit, comprises an electric motor for generating a driving force, a wheel shaft to which the body of a wheel is connected, and a speed reducer for reducing and transmitting the rotation of the electric motor to the wheel shaft. The speed reducer is a gear speed reducer with parallel shafts in which a plurality of gears having different numbers of teeth are combined.

JP Patent Publication 5-332401A discloses a speed reducer for use in an electric vehicle, which includes planetary gear speed reducer units provided in two stages between the rotor of an electric motor and wheel hubs. The output of the second-stage planetary gear speed reducer unit is distributed to right and left wheels under springs.

Because the in-wheel motor driving unit disclosed in JP Patent Publication 2005-7914A eliminates the necessity for large-sized power transmission mechanisms such as propeller shafts and differentials are not necessary, use of such driving units can reduce the weight and size of the vehicle. But the reduction ratio provided by the gear speed reducer with parallel shafts is only about ½ to ⅓, which is insufficient as a speed reducer mounted in an in-wheel motor driving unit. Also, because such a speed reducer is heavyweight, the use of such speed reducers adds to the weight of the vehicle under the springs, thereby deteriorating the drive feel. Thus, this in-wheel motor driving unit is not yet put to practical use.

Although the planetary gear speed reducer units of the speed reducer for an electric vehicle disclosed in JP Patent Publication 5-332401A provide a higher reduction ratio than gear speed reducers with parallel shafts, their reduction ratio is still insufficient for use in an in-wheel motor driving unit. In order to obtain a sufficiently high reduction ratio, planetary gear speed reducing units, which each comprise a sun gear, a ring gear, pinion gears and a carrier for the pinion gears, have to be provided in many stages. This increases the number of parts of the speed reducer and makes it difficult to provide a compact speed reducer. That is, such a speed reducer tends to be heavyweight and large in size.

SUMMARY OF THE INVENTION

An object of the invention is to provide a compact power transmission device which comprises a small number of parts and is compact in size, and which can transmit the rotation of a rotary shaft to a wheel with a high reduction ratio.

In order to achieve the above objects, the present invention provides a power transmission device (an in-wheel motor driving unit) comprising an outer member mounted to a vehicle body and formed with two raceways on an inner periphery thereof near its outboard end, an inner member having two raceways formed on an outer periphery thereof so as to radially oppose the respective raceways of the outer member, and a wheel-mounting flange formed on an outer periphery thereof at its end portion that protrudes from the outer member, rolling elements received between the two raceways of the outer member and the two raceways of the inner member in two rows, a rotary shaft coaxial with the inner member and having an eccentric portion received in the outer member, an external gear rotatably supported on the eccentric portion of the rotary shaft and having external teeth which are smaller in number than internal teeth formed on the inner periphery of the outer member, and which mesh with the internal teeth, and a torque transmission means disposed between the external gear and the inner member for transmitting rotation of the external gear about its own axis when the eccentric portion rotates eccentrically with respect to the inner member, while allowing free rotation of the center of the external gear about the axis of the rotary shaft.

With the power transmission device of the embodiment, when the rotary shaft rotates, the eccentric portion eccentrically rotates. Thus, the center of the external gear, which is rotatably supported on the eccentric portion, rotates about the axis of the rotary shaft, with the external gear meshing with the internal teeth formed on the inner periphery of the outer member one after another.

Because the number of the external teeth of the external gear is smaller than the number of the internal teeth formed on the inner periphery of the outer member, every time the rotary shaft rotates once, the external gear rotates about its own axis in the direction opposite to the direction in which the rotary shaft rotates by an amount corresponding to the difference in number between the internal teeth and the external teeth. The rotation of the external gear about its own axis is transmitted through the torque transmission means to the inner member, so that the rotation of the rotary shaft is transmitted to the wheel coupled to the inner member at a reduced speed.

The external teeth formed on the outer periphery of the external gear and the internal teeth formed on the inner periphery of the outer member may have an involute profile. Alternatively, the external teeth formed on the outer periphery of the external teeth may have a trochoidal profile, with the internal teeth, with which the external teeth mesh, comprising outer pins. With the latter arrangement, it is possible to improve the meshing rate, and also possible to provide a durable power transmission device of which the teeth are less likely to break.

The inner member may comprise a hub ring having the wheel-mounting flange on the outer periphery thereof, and a bearing inner ring having a tubular portion at an outboard end thereof which is inserted in and secured to the hub ring by radially outward caulking from radially inside thereof.

The torque transmission means may comprise a plurality of inner pins provided on one of axially opposed surfaces of the external gear and the inner member along the circumference of a circle at equal intervals, and circular holes formed in the other of the axially opposed surfaces and having a larger diameter than the inner pins, the inner pins being each inserted in one of the circular holes so as to be partially in contact with the inner wall thereof.

A roller may be rotatably mounted on each of the inner pins so as to be partially in contact with the inner wall of the corresponding circular hole. With this arrangement, because the inner pins are brought into rolling contact with the circular holes, it is possible to reduce the contact resistance and thus torque loss.

The power transmission device may further comprise a counterweight mounted to the rotary shaft and having a center of gravity which is located diametrically opposite to the center of the eccentric portion with respect to the axis of the rotary shaft. With this arrangement, it is possible to cancel vibrations due to eccentric rotation of the external gear with the eccentric rotation of the counterweight, thereby providing a power transmission device that is less likely to vibrate.

Two of the eccentric portions may be provided which each rotatably support an external gear and which are circumferentially displaced in phase by 180° from each other. With this arrangement, because power of the rotary shaft can be transmitted to the inner member through two power transmission paths, it is possible to reduce the load of the rotation torque transmitted through each power transmission path, so that the rotation torque can be more stably transmitted. Also, since vibrations due to eccentric rotation of the two eccentric portions are canceled by each other, it is possible to provide a power transmission device which is less likely to vibrate.

By connecting the rotor of an electric motor to the rotary shaft, it is possible to form a small and compact in-wheel motor driving unit.

According to the present invention, as described above, every time the rotary shaft rotates once, the external gear supported by the eccentric portion rotates about its own axis by an amount corresponding to the difference in number between the internal teeth formed on the inner periphery of the outer member and the external teeth formed on the outer periphery of the external gear, and the rotation of the external gear about its own axis is transmitted through the torque transmission means to the inner member, so that the rotation of the rotary shaft can be transmitted to the inner member, to which a wheel is mounted, with a high reduction ratio.

Because the speed reducer comprises a small number of parts, i.e. the internal teeth formed on the inner periphery of the outer member, the external gear supported on the eccentric portion of the rotary shaft, and the torque transmission means for transmitting the rotation of the external gear about its own axis, it is possible to obtain a compact power transmission device.

DETAILED DESCRIPTION OF THE INVENTION

Figure 1:
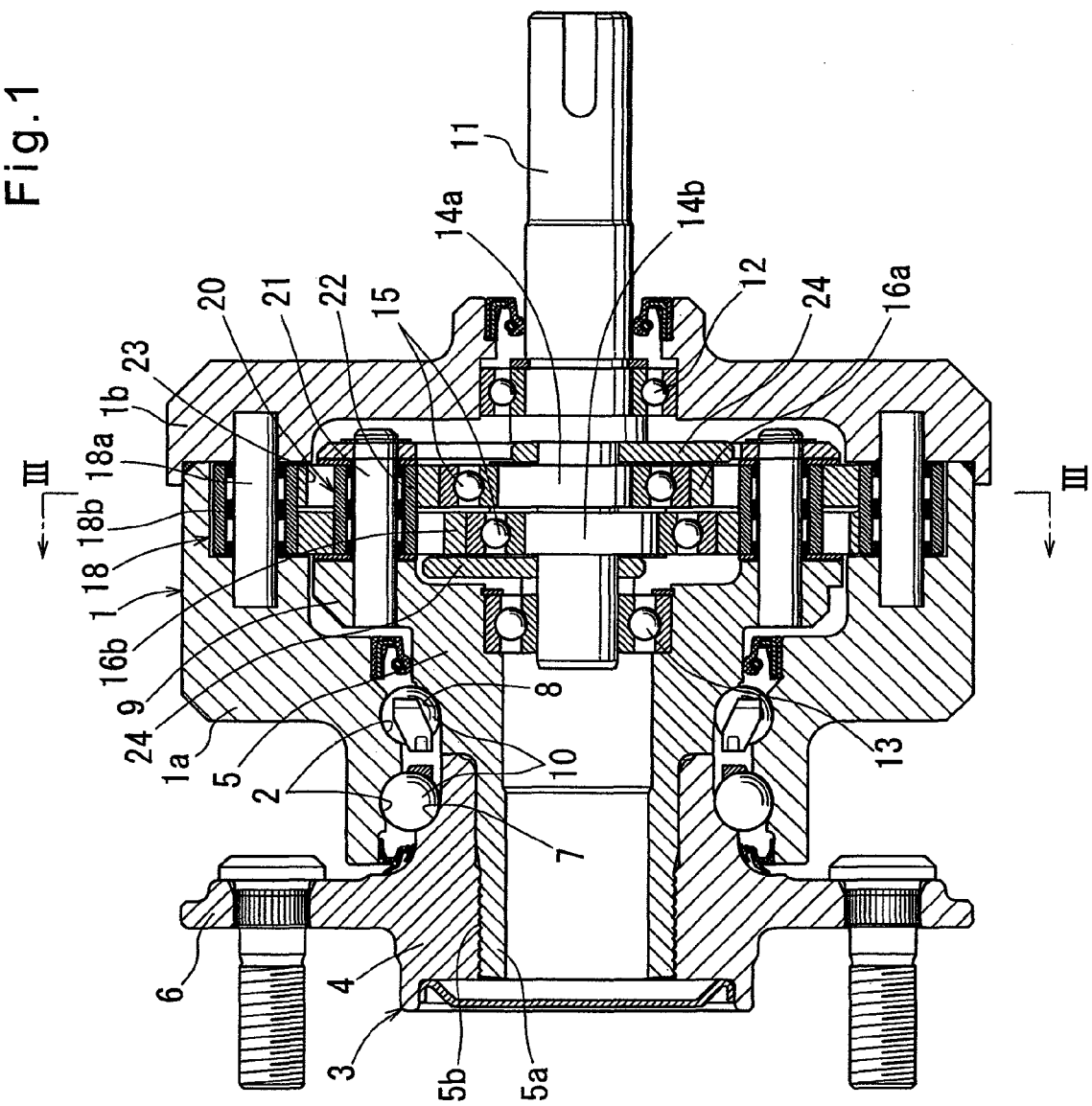
FIG. 1 is vertical sectional front view of a power transmission device embodying the present invention.

Now the embodiments of the invention are described with reference to the drawings. As shown in FIG. 1, a casing 1 as an outer member, which is mounted to a vehicle body, comprises a casing body 1a, and a cover 1b closing an inboard open end of the casing body 1a. Two raceways 2 are formed on the inner periphery of the casing body 1a near its outboard end.

An inner member 3 is inserted in the outboard end portion of the casing 1. The inner member 3 comprises a hub ring 4 and a bearing inner ring 5. The bearing inner ring 5 has a tubular portion 5a at one end thereof. The tubular portion 5a is fitted in the hub ring 4 and secured to the hub ring 4 by radially outward caulking from radially inside thereof.

In order to increase the coupling force by the radially outward caulking, microscopically roughened surface 5b is preferably formed on at least one of the radially inner surface of the hub ring 4 and the radially outer surface of the tubular portion 5a.

A wheel-mounting flange 6 is formed on the outer periphery of the hub ring 4 at its end portion protruding from the casing 1. On the outer periphery of the opposite end portion of the hub ring 4, which is located inside the casing 1, a raceway 7 is formed which radially opposes one of the two raceways 2 formed on the inner periphery of the casing 1 at its end.

A raceway 8 is formed on the outer periphery of the bearing inner ring 5 at one end thereof so as to radially oppose the other of the two raceways 2. At the other end of the bearing inner ring 5, a flange 9 is formed.

Between the two raceways 7 and 8 of the inner member 3 and the two raceways 2 of the casing 1, rolling elements 10 are received in two rows. The two rows of rolling elements 10 rotatably support the inner member 3.

A rotary shaft 11 extends through the cover 1b and is rotatably supported by a bearing 12 mounted between the cover 1b and the rotary shaft 11 and a bearing 13 mounted between the other end of the bearing inner ring 5 and the rotary shaft 11 so as to be coaxial with the inner member 3.

At its end portion received in the casing 1, the rotary shaft 11 includes two eccentric portions 14a and 14b which are circumferentially displaced in phase by 180° from each other. External gears 16a and 16b are rotatably supported on the respective eccentric portions 14a and 14b through bearings 15 mounted around the respective eccentric portions 14a and 14b.

Figure 3:
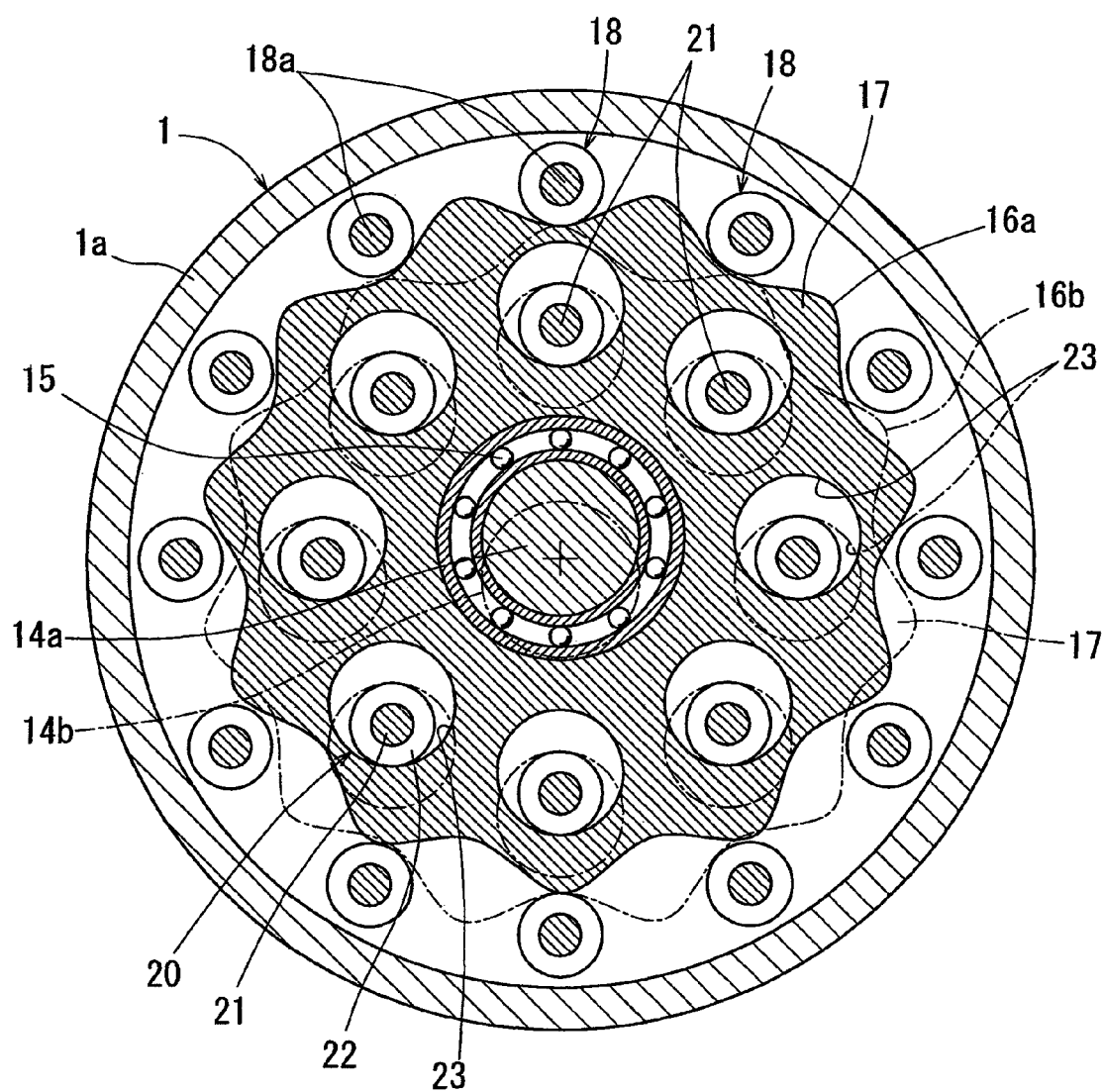
FIG. 3 is a sectional view taken along line III-III of FIG. 1.

As shown in FIG. 3, the external gears 16a and 16b each have a plurality of external teeth 17 on the outer periphery thereof which mesh with internal teeth 18 provided on the inner periphery of the casing 1. The number of the external teeth 17 on each of the external gears 16a and 16b is smaller than that of the internal teeth 18. Each external tooth 17 has a trochoidal profile. Each internal tooth 18 comprises an outer pin 18a having its respective ends supported by the casing body 1a and the cover 1b, and a roller 18b rotatably supported by the outer pin 18a.

Figure 4:
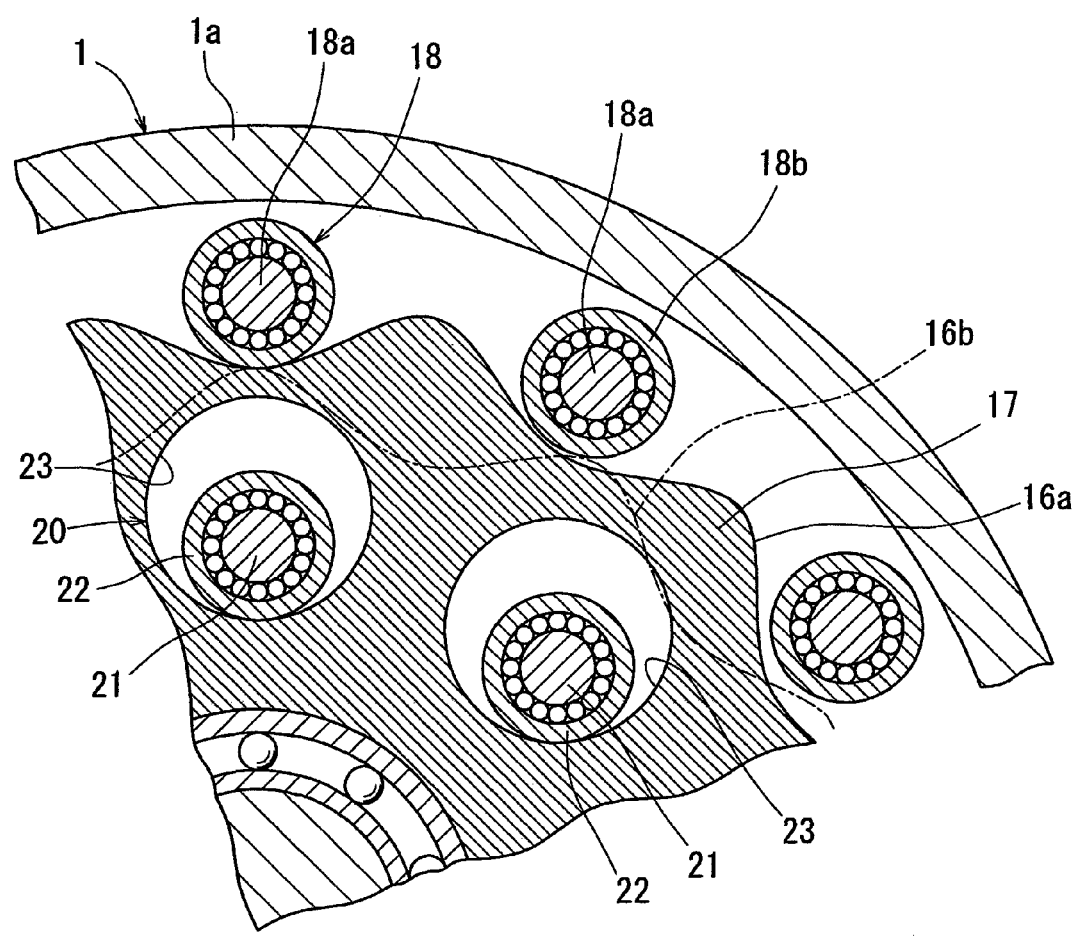
FIG. 4 is an enlarged sectional view of a portion of FIG. 3.

In the embodiment, as shown in FIG. 4, each roller 18b comprises a needle bearing for reduced radial thickness. But the rollers 18b may be in any other form. For example, the rollers 18b may be any type of rolling bearings including either balls or rollers as rolling elements, such as cylindrical roller bearings, tapered roller bearings, angular ball bearings, four-point contact ball bearings and self-aligning roller bearings.

The internal teeth 18 may each consist only of the outer pin 18a with the roller 18b omitted. Also, the external teeth 17 and the internal teeth 18 may both have an involute profile.

As shown in FIGS. 1 and 3, between the external gears 16a and 16b and the flange 9 formed on the bearing inner ring 5, a torque transmission means 20 is provided for transmitting the rotation of the external gears about their own axes to the inner member 3, while allowing free rotation of their centers about the axis of the shaft 11.

The torque transmission means 20 comprises a plurality of inner pins 21 provided on the side surface of the flange 9 of the bearing inner ring 5 that faces the external gear 16b along the circumference of a circle whose center is located on the axis of the bearing inner ring 5 so as to be circumferentially equidistantly spaced from each other, and rollers 22 each rotatably mounted around one of the inner pins 21 and received in one of circular holes 23 formed in each of the external gears 16a and 16b and having a larger diameter than the rollers 22 so as to be partially in contact with the inner wall of each hole 23.

In the embodiment, because the rotary shaft 11 has the two eccentric portions 14a and 14b, and the external gears 16a and 16b are rotatably mounted around the respective eccentric portions 14a and 14b, the inner pins 21 supporting the rollers 22 are provided on the flange, and the circular holes 23 are formed in the external gears 16a and 16b. But in an arrangement in which only one external gear is provided, inner pins provided on the single external gear and supporting rollers may be inserted in circular holes formed in the flange.

The rollers 22 of the embodiment are needle bearings, but any other type of bearings may be used as the rollers 22. Also, the inner pins 21 may be rotatably supported with the rollers 22 omitted. In this arrangement, the pins 21 are partially brought into contact with the inner walls of the circular holes.

Figure 2:
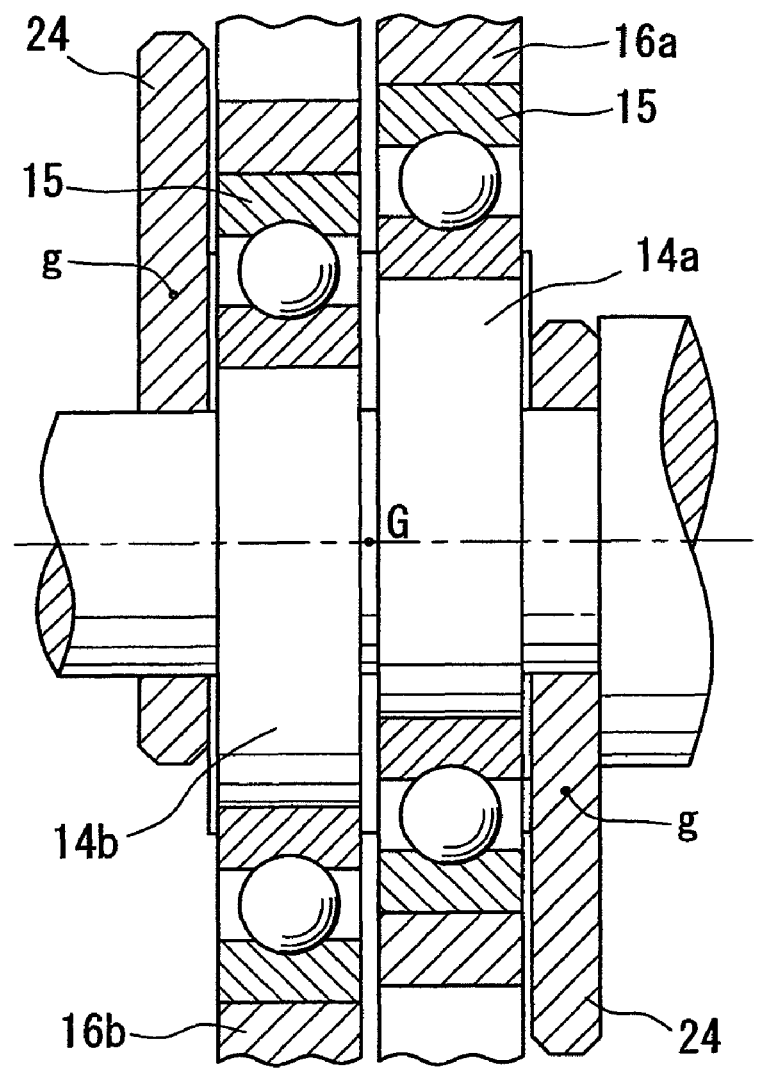
FIG. 2 is an enlarged sectional view of FIG. 1, showing eccentric portions formed on the rotary shaft.

As shown in FIG. 2, the rotary shaft 11 has a pair of counterweights 24 each provided on one side of the two eccentric portions 14a and 14b. Each of the counterweights 24 has a center of gravity g that is located diametrically opposite to the center of the eccentric portion 14a or 14b that is located close thereto, with respect to the axis of the rotary shaft.

Referring to FIG. 2, the eccentric portion 14a, the external gear 16a and one of the counterweights 24 which is located on the right-hand side of the midpoint G between the eccentric portions 14a and 14b constitute a first eccentric rotary member which has the same mass as the second eccentric rotary member comprising the eccentric portion 14b, the external gear 16b and the other of the counterweights 24, which is located on the left-hand side of the midpoint G. The axial and radial distances from the center of gravity of the first eccentric rotary member to the midpoint G and to the axis of the rotary shaft, respectively, are equal to the axial and radial distances from the center of gravity of the second eccentric rotary member to the midpoint G and to the axis of the rotary shaft, respectively, so that the force couple produced by the eccentric rotation of one of the first and second eccentric rotary members is canceled by the force couple produced by the eccentric rotation of the other of the first and second eccentric rotary members.

With the power transmission device of the embodiment, when the rotary shaft 11 rotates, the eccentric portions 14a and 14b eccentrically rotate. Thus, the centers of the external gears 16a and 16b, which are rotatably supported on the respective eccentric portions 14a and 14b, rotate about the axis of the rotary shaft 11, with the respective external gears 14a 14b meshing with the internal teeth 18 formed on the inner periphery of the casing 1 one after another.

Because the number of the external teeth 17 of each of the external gears 16a and 16b is smaller than the number of the internal teeth 18 formed on the inner periphery of the casing 1, every time the rotary shaft 11 rotates once, the external gears 16a and 16b rotate about their own axes in the direction opposite to the direction in which the rotary shaft rotates by an amount corresponding to the difference in number between the internal teeth 18 and the external teeth 17. The rotation of the external gears about their own axes is transmitted through the torque transmission means 20 to the inner member 3, so that the inner member 3 rotates at a reduced speed.

The reduction ratio in this case is given by $(Z_1-Z_2)/Z_2$, where $Z_1$ is the number of the internal teeth 18, and $Z_2$ is the number of the teeth of each of the external gears 16a and 16b.

With the power transmission device of the embodiment, every time the rotary shaft 11 rotates once, the external gears 16a and 16b rotate about their own axes in the direction opposite to the direction in which the rotary shaft rotates by an amount corresponding to the difference in number between the internal teeth 18 and the external teeth 17, and the rotation of the external gears about their own axes is transmitted through the torque transmission means 20 to the inner member 3. Thus, it is possible to transmit the rotation of the rotary shaft 11 to the inner member 3 with a high reduction ratio.

Also, because the speed reducer comprises a small number of parts, i.e. the external gears 16a and 16b and the internal teeth 18 formed on the inner periphery of the casing 1, it is possible to obtain a small-sized compact power transmission device.

Figure 5:
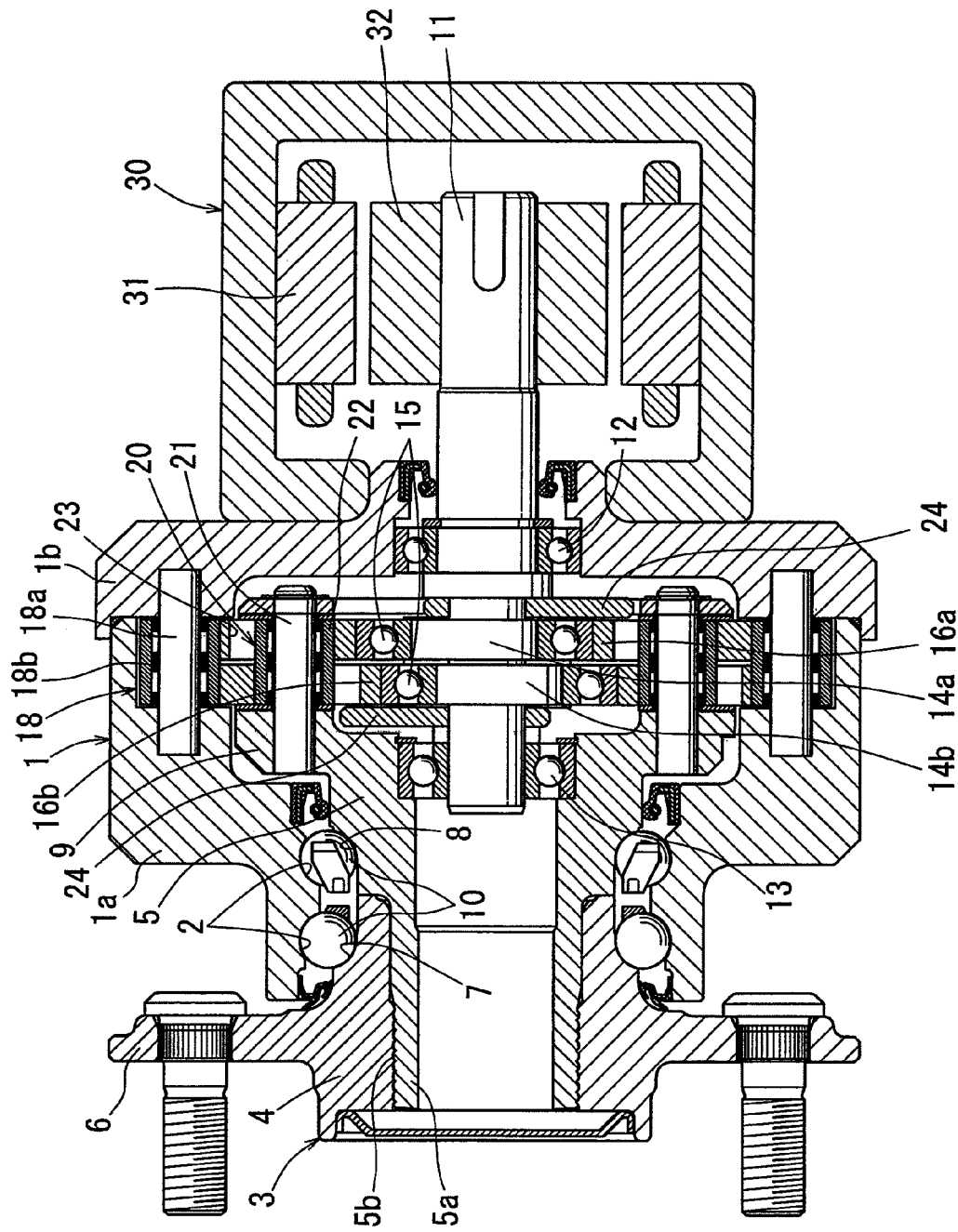
FIG. 5 is a vertical sectional front view of another power transmission device embodying the present invention.

As shown in FIG. 5, by driving the rotary shaft 11 with an electric motor 30 connected to an end of the shaft 11, it is possible to obtain a small-sized and lightweight in-wheel motor driving unit.

The stator 31 and the rotor 32 of the electric motor 30 may be mounted in the casing 1.

The power transmission device in which the rotary shaft 11 is rotated by the electric motor 30 is controlled by entering signals from various sensors, such as an accelerator pedal sensor, a brake pedal sensor, a vehicle speed sensor, a battery temperature sensor, a voltage sensor connected between battery terminals, a current sensor provided in a power line extending from the battery, and a sensor for detecting the rotational position of the motor, into an electronic control unit, and adjusting electric power transmitted between the battery and the electric motor based on these signals.

A plurality of the power transmission devices according to the present invention may be e.g. each mounted to one of the front and/or rear wheels of a vehicle. Such power transmission devices may be driven independently of each other according e.g. to the steering angle of the steering wheel to independently control the rotational speeds of the corresponding wheels, thereby stably turning the vehicle. Otherwise, the rotational speeds of such power transmission devices may be controlled when one or more of the wheels are determined to be spinning based on signals from wheel speed sensors for the respective front and rear wheels, thereby stabilizing the attitude of the vehicle.

What is claimed is:

1. An in-wheel motor driving unit for driving a wheel via a speed reducer, said driving unit comprising:
    an electric motor having a rotor;
    a rotary shaft having its end connected to the electric motor to be rotated by the rotor of the electric motor, said rotary shaft including an eccentric portion;
    internal teeth;
    an external gear rotatably supported by the eccentric portion of the rotary shaft and including external teeth formed on an outer periphery of the external gear, said external teeth being fewer in number than the internal teeth, and having a trochoidal profile;
    a torque transmission configured to convert the rotation of the center of the external gear about the axis of the rotary shaft when the eccentric portion eccentrically rotates relative to the rotation of the external gear about its own axis, to thereby transmit power; and
    rolling elements disposed between an inner member formed with a raceway and an outer member formed with a raceway;
    wherein each of the internal teeth comprises an outer pin and a roller rotatably supported by the outer pin; and
    wherein said roller of each of said internal teeth comprises a needle bearing.

2. The in-wheel motor driving unit of claim 1, further comprising a counterweight mounted to said rotary shaft and having a center of gravity which is located diametrically opposite to the center of said eccentric portion with respect to the axis of the rotary shaft.

3. The in-wheel motor driving unit of claim 1, wherein said eccentric portion constitutes a first eccentric portion, and said rotary shaft further includes a second eccentric portion; and each of said first and second eccentric portions rotatably supports an external gear and said first and second eccentric portions are circumferentially displaced in phase by 180° from each other.

4. The in-wheel motor driving unit of claim 1, wherein said torque transmission comprises a plurality of inner pins provided on one of axially opposed surfaces of said external gear and said inner member along the circumference of a circle at equal intervals, and circular holes formed in the other of said axially opposed surfaces and having a larger diameter than said inner pins, said inner pins being each inserted in one of said circular holes so as to be partially in contact with an inner wall thereof.

5. The in-wheel motor driving unit of claim 4, wherein a roller is rotatably mounted on each of said inner pins and is partially in contact with the inner wall of a corresponding one of said circular holes.

* * * * *